(12) United States Patent
Wässingbo

(10) Patent No.: US 7,555,291 B2
(45) Date of Patent: Jun. 30, 2009

(54) MOBILE WIRELESS COMMUNICATION TERMINALS, SYSTEMS, METHODS, AND COMPUTER PROGRAM PRODUCTS FOR PROVIDING A SONG PLAY LIST

(75) Inventor: Tomas Karl-Axel Wässingbo, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 130 days.

(21) Appl. No.: 11/212,201

(22) Filed: Aug. 26, 2005

(65) Prior Publication Data

US 2007/0049256 A1    Mar. 1, 2007

(51) Int. Cl.
H04M 3/42      (2006.01)

(52) U.S. Cl. ............... 455/414.1; 455/414.3; 709/231; 84/600; 84/645; 84/180; 84/181; 84/170; 84/671; 84/730; 84/47; 84/79; 84/461; 370/157; 370/158; 370/259; 370/271; 375/256

(58) Field of Classification Search ............ 455/414.1, 455/414.3; 709/231; 84/600, 645, 180, 181, 84/170, 671, 730, 47, 79, 461; 379/157, 379/158; 375/256

See application file for complete search history.

(56) References Cited

U.S. PATENT DOCUMENTS

| | | | |
|---|---|---|---|
| 6,226,672 B1 * | 5/2001 | DeMartin et al. ........... 709/219 |
| 6,237,025 B1 | 5/2001 | Ludwig et al. | |
| 6,424,820 B1 | 7/2002 | Burdick et al. | |
| 6,933,433 B1 * | 8/2005 | Porteus et al. ................ 84/615 |
| 7,076,561 B1 * | 7/2006 | Rosenberg et al. .......... 709/231 |
| 7,302,468 B2 * | 11/2007 | Wijeratne ................... 709/205 |
| 7,352,997 B2 | 4/2008 | Torvinen | |
| 2002/0065928 A1 | 5/2002 | Senga et al. | |
| 2002/0074413 A1 * | 6/2002 | Henzerling ................. 235/492 |

(Continued)

FOREIGN PATENT DOCUMENTS

EP    1 478 134 A1    11/2004

(Continued)

OTHER PUBLICATIONS

Press Releases—Nokia introduces the Nokia N91 for a true mobile music experience—Apr. 27, 2005 cited on http://press.nokia.com/PR/200504/991481_5.html.*

(Continued)

*Primary Examiner*—Rafael Pérez-Gutiérrez
*Assistant Examiner*—Nimesh Patel
(74) *Attorney, Agent, or Firm*—Myers Bigel Sibley & Sajovec, P.A.

(57) ABSTRACT

A mobile wireless communication terminal includes a wireless communication module and a controller. The wireless communication module is configured to communicate with other communication terminals over a wireless interface. The controller is configured to establish a connection with a participant wireless communication terminal via the wireless communication module, to maintain a play list representing song files to be played, to receive a participant song identification from the participant wireless communication terminal, wherein the participant song identification corresponds to a participant song file stored on the participant wireless communication terminal, to add the participant song identification to the play list, and to thereafter execute playback of the song files represented by the play list, including retrieving the participant song file from the participant wireless communication terminal for playback.

21 Claims, 4 Drawing Sheets

U.S. PATENT DOCUMENTS

| | | | |
|---|---|---|---|
| 2002/0143972 A1 | 10/2002 | Christopoulos et al. | |
| 2003/0022667 A1 | 1/2003 | Kim | |
| 2003/0037157 A1 | 2/2003 | Pestoni et al. | |
| 2003/0114191 A1 | 6/2003 | Nishimura | |
| 2003/0135513 A1 | 7/2003 | Quinn et al. | |
| 2003/0227478 A1* | 12/2003 | Chatfield | 345/751 |
| 2004/0136338 A1 | 7/2004 | Lin et al. | |
| 2004/0141476 A1* | 7/2004 | Chumbley et al. | 370/326 |
| 2004/0162062 A1* | 8/2004 | Lee | 455/414.3 |
| 2004/0176025 A1* | 9/2004 | Holm et al. | 455/3.06 |
| 2004/0224638 A1* | 11/2004 | Fadell et al. | 455/66.1 |
| 2004/0259581 A1 | 12/2004 | Crisler et al. | |
| 2004/0266407 A1* | 12/2004 | Lee et al. | 455/414.1 |
| 2005/0037708 A1 | 2/2005 | Torvinen | |
| 2005/0107073 A1 | 5/2005 | Cheiky et al. | |
| 2005/0165911 A1 | 7/2005 | Homiller | |
| 2005/0188011 A1 | 8/2005 | Parnes | |
| 2005/0276236 A1* | 12/2005 | Chen | 370/310 |
| 2006/0008256 A1* | 1/2006 | Khedouri et al. | 386/124 |
| 2006/0167997 A1 | 7/2006 | Forstadius | |
| 2006/0179078 A1* | 8/2006 | McLean | 707/104.1 |
| 2006/0265349 A1 | 11/2006 | Hicken | |
| 2007/0010195 A1* | 1/2007 | Brown et al. | 455/3.06 |
| 2007/0038639 A1 | 2/2007 | Kim | |
| 2007/0161402 A1 | 7/2007 | Ng et al. | |
| 2007/0282905 A1 | 12/2007 | Karlberg | |
| 2008/0043644 A1 | 2/2008 | Barkley et al. | |
| 2008/0076469 A1 | 3/2008 | Shin et al. | |

FOREIGN PATENT DOCUMENTS

| | | |
|---|---|---|
| EP | 1 615 464 A1 | 1/2006 |
| WO | WO 2004/023841 A | 3/2004 |
| WO | WO 2005/073856 A2 | 8/2005 |
| WO | WO 2005/112422 A1 | 11/2005 |

OTHER PUBLICATIONS

Jones et al., "Emerging Technologies," Language Learning and Technology, Jan. 2002, vol. 6 (1), pp. 6-10.

*Bluetooth Media Center MMV-200*, http://www.sonyericsson.com/spg.jsp?cc=us&lc=en&ver=4000&template=pp4_1_1&zone..., 2 pages, dated Jun. 16, 2006.

*Bluetooth Media Center MMV-200*, http://www.sonyericsson.com/spg.jsp?cc=us&lc=en&ver=4000&page=php1_10252&pid=..., 2 pages, dated Jun. 16, 2006.

International Search Report and the Written Opinion of the International Searching Authority for PCT Application No. PCT/EP2006/065350 mailed Nov. 24, 2006.

*Sony Ericsson unveils the Bluetooth Media Viewer MMV100 printer friendly*, http://www.pocket-lint.co.uk/printnews.php?newsId=238, 1 page, dated Jul. 11, 2005.

*MMS- Share the good times*, http://www.ericsson.com/mms/, 3 pages, dated Jul. 11, 2005.

*Trust- Bluetooth information*, http://www.trust.com/service/help/bluetooth/default.aspx, 12 pages, dated Jul. 11, 2005.

U.S. Appl. No. 11/447,374, filed Jun. 6, 2006, entitled "Communication Terminals and Methods for Prioritizing the Playback of Distributed Multimedia Files."

* cited by examiner

MOBILE WIRELESS COMMUNICATION TERMINALS, SYSTEMS, METHODS, AND COMPUTER PROGRAM PRODUCTS FOR PROVIDING A SONG PLAY LIST

FIELD OF THE INVENTION

The present invention relates to electronic devices and, more particularly, to electronic devices, methods and computer program products for playing song files.

BACKGROUND OF THE INVENTION

Mobile electronic devices, such as wireless communication terminals (e.g., cellular telephones), are widely used to store and playback song files. A user may wish to play a song file on another device such as a media center (e.g., a PC or laptop, a television, an audio receiver, etc.) or another wireless communication terminal. This may be accomplished by connecting the electronic device to the other device via a cable or a wireless link (e.g., a Bluetooth connection) if the other device is equipped with a suitable communication module, which may be an integrated module or an auxiliary (e.g., plug-in) module. Song files may be sent, one by one, from one or more mobile electronic devices to the playback device(s).

SUMMARY OF THE INVENTION

According to embodiments of the present invention, a mobile wireless communication terminal includes a wireless communication module and a controller. The wireless communication module is configured to communicate with other communication terminals over a wireless interface. The controller is configured to establish a connection with a participant wireless communication terminal via the wireless communication module, to maintain a play list representing song files to be played, to receive a participant song identification from the participant wireless communication terminal, wherein the participant song identification corresponds to a participant song file stored on the participant wireless communication terminal, to add the participant song identification to the play list, and to thereafter execute playback of the song files represented by the play list, including retrieving the participant song file from the participant wireless communication terminal for playback.

The controller may be configured to establish a connection with a plurality of participant wireless communication terminals, to receive a plurality of participant song identifications from the plurality of participant wireless communication terminals, wherein each participant song identification corresponds to a respective participant song file stored on a respective one of the plurality of participant wireless communication terminals, to add each of the participant song identifications to the play list, and to retrieve the participant song files from each of the respective participant wireless communication terminals for playback.

According to some embodiments, the controller is configured to retrieve and execute the participant song file from the participant wireless communication terminal as a streaming music file.

According to some embodiments, the controller is configured to retrieve the participant song file from the participant wireless communication terminal, to store the participant song file on the wireless communication terminal, and to thereafter execute playback of the stored participant song file.

The controller may be configured to send a playback signal to a media center for playback of the song files represented by the play list on the media center.

According to some embodiments, the wireless communication terminal includes a sound transducer. The controller is configured to play the song files represented by the play list using the sound transducer.

The controller may be configured to send a playback signal to at least one participant wireless communication terminal for playback of the song files represented by the play list on the at least one participant wireless communication terminal.

The controller may be configured to receive a song catalog listing from the participant wireless communication terminal representing available song files stored on the participant wireless communication terminal, to receive user input selecting from the available song files, and to add the selected available song files to the play list.

According to some embodiments, the controller is configured to send a listing signal to the participant wireless communication terminal representing the play list for display of the play list on the participant wireless communication terminal.

The controller may be configured to modify the play list responsive to user input.

According to some embodiments, the wireless communication module is configured to communicate with other communication terminals over a direct point-to-point wireless interface. The controller is configured to establish the connection with the participant wireless communication terminal, receive the participant song identification from the participant wireless communication terminal, and retrieve the participant song file from the participant wireless communication terminal for playback all via the direct point-to-point wireless interface.

According to some embodiments, the wireless communication module comprises a short range transmitter. The controller is configured to establish the connection with the participant wireless communication terminal, receive the participant song identification from the participant wireless communication terminal, and retrieve the participant song file from the participant wireless communication terminal for playback all via the short range transmitter. The short range transmitter may be a Bluetooth™ transmitter.

The wireless communication terminal may include a cellular telephone.

According to further embodiments of the present invention, a system for providing a song play list includes a host mobile wireless communication terminal and a participant wireless communication terminal. The host wireless communication terminal includes a wireless communication module and a controller. The wireless communication module is configured to communicate with other communication terminals over a wireless interface. The controller is configured to establish a connection with the participant wireless communication terminal via the wireless communication module, to maintain a play list representing song files to be played, to receive a participant song identification from the participant wireless communication terminal, wherein the participant song identification corresponds to a participant song file stored on the participant wireless communication terminal, to add the participant song identification to the play list, and to thereafter execute playback of the song files represented by the play list, including retrieving the participant song file from the participant wireless communication terminal for playback.

According to some embodiments, the system includes a plurality of participant wireless communication terminals. The controller is configured to establish a connection with each of the plurality of participant wireless communication terminals, to receive a plurality of participant song identifications from the plurality of participant wireless communication terminals, wherein each participant song identification corresponds to a respective participant song file stored on a respective one of the plurality of participant wireless communication terminals, to add each of the participant song identifications to the play list, and to retrieve the participant song files from each of the respective participant wireless communication terminals for playback.

According to further embodiments of the present invention, methods for providing a song play list using a host wireless communication terminal includes: establishing a wireless connection between the host wireless communication terminal and a participant wireless communication terminal; maintaining a play list using the host wireless communication terminal, the play list representing song files to be played; receiving at the host wireless communication terminal a participant song identification from the participant wireless communication terminal, wherein the participant song identification corresponds to a participant song file stored on the participant wireless communication terminal; adding the participant song identification to the play list; and thereafter executing playback of the song files represented by the play list, including retrieving the participant song file from the participant wireless communication terminal for playback.

According to further embodiments of the present invention, a computer program product for providing a song play list using a host wireless communication terminal includes a computer usable medium having computer usable program code embodied therein, the computer usable program code comprising: computer usable program code configured to establish a wireless connection between the host wireless communication terminal and a participant wireless communication terminal; computer usable program code configured to maintain a play list using the host wireless communication terminal, the play list representing song files to be played; computer usable program code configured to receive at the host wireless communication terminal a participant song identification from the participant wireless communication terminal, wherein the participant song identification corresponds to a participant song file stored on the participant wireless communication terminal; computer usable program code configured to add the participant song identification to the play list; and computer usable program code configured to thereafter execute playback of the song files represented by the play list, including retrieving the participant song file from the participant wireless communication terminal for playback.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
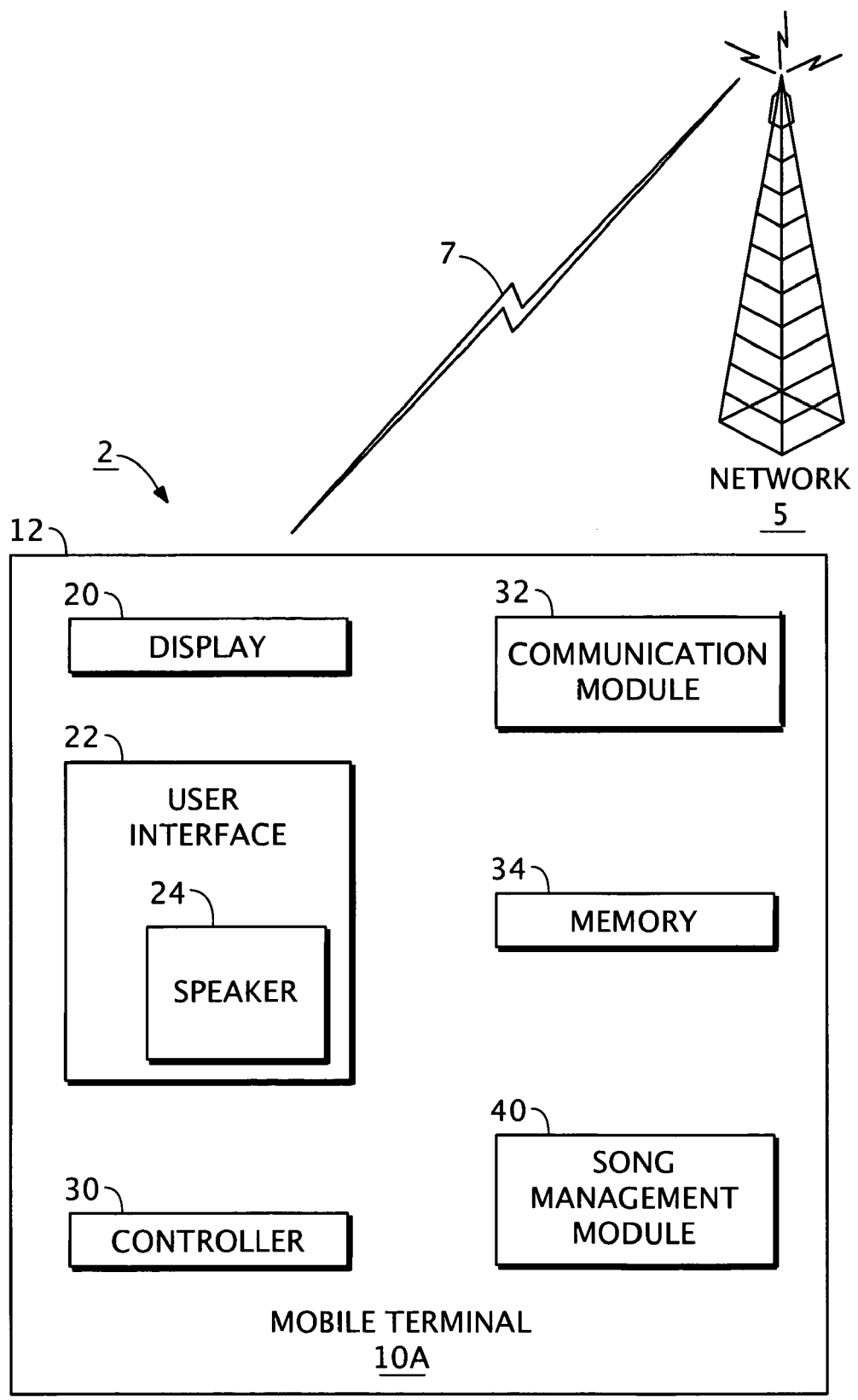
FIG. 1 is a schematic diagram of a mobile wireless communication terminal according to some embodiments of the present invention and an exemplary base station transceiver.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function (s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, or semiconductor system, apparatus, or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, "streamed" or "streaming" means that a file, such as an audio or song file, is continuously sent via a digital signal to a receiving device where the audio or song file is concurrently played via a suitable receiving application. The digital signal is typically buffered.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Some embodiments of the present invention will now be described below with respect to FIGS. 1-6. Some embodiments of the present invention provide mobile wireless communication terminals capable of providing a song play list including one or more song identifications from another wireless communication terminal.

Referring now to FIG. 1, an exemplary mobile wireless communication terminal 10A in accordance with some embodiments of the present invention is illustrated. The wireless terminal 10A is configured to communicate data with one or more other wireless terminals over a direct wireless communication interface therebetween, over another wireless communication interface through one or more cellular base stations, and/or over another wireless communication interface through a wireless local area network (WLAN) router.

The wireless terminal 10A may be a mobile radiotelephone forming a part of a radiotelephone communication system 2 as illustrated in FIG. 1. The system 2 includes the mobile wireless communication terminal 10A and a base station transceiver, which is part of a wireless communications network 5. In some embodiments of the present invention, the network 5 includes a base station transceiver that includes the radio transceiver(s) that define an individual cell in a cellular network and communicates with the mobile terminal 10A (via an interface 7) and other mobile terminals in the cell using a radio-link protocol. It will be understood that, in some embodiments of the present invention, many base station transceivers may be connected through, for example, a mobile switching center and other devices to define the wireless communications network 5.

The mobile terminal 10A in the illustrated embodiments includes a portable housing assembly 12, a display 20, a user interface 22 (i.e., a man machine interface (MMI)) including a speaker 24 (i.e., a sound transducer), a controller 30, a communication module 32, and a memory 34. The foregoing components of the mobile terminal 10A may be included in many conventional mobile terminals and their functionality is generally known to those skilled in the art. The mobile terminal 10A further includes a song management module 40, which may be stored in the memory 34.

The display 20 may be any suitable display screen assembly. For example, the display screen 20 may be a liquid crystal display (LCD) with or without auxiliary lighting (e.g., a lighting panel).

The user interface 22 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 24 generates sound responsive to an input audio signal. The user interface 22 can also include a microphone coupled to an audio processor that is configured to generate an audio data stream responsive to sound incident on the microphone.

The controller 30 may support various functions of the mobile terminal 10A. The controller 30 can be any commercially available or custom microprocessor, for example. In use, the controller 30 of the mobile terminal 10A generates a display image on the display 20.

The memory 34 is configured to store digital information signals and data such as a digital audio signal and/or digital audio files.

The communication module 32 is configured to communicate data over one or more wireless interfaces (e.g., wireless interfaces 7, 112, 114, 116, 122, and 134 as discussed herein (FIGS. 1 and 3)) to another remote wireless terminal as discussed herein. The communication module 32 can include a cellular communication module, a direct point-to-point connection module, and/or a WLAN module.

With a cellular communication module, the wireless terminal 10A can communicate via the base station(s) of the network 5 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the wireless terminal 10A can communicate via an ad-hoc network through a direct point-to-point interface.

With a WLAN module, the wireless terminal 10A can communicate through a WLAN (e.g., a router 120 (FIG. 3)) using a communication protocol that may include, but is not limited to, 802.11a, 802.11b, 802.11e, 802.11g, and/or 802.11i.

The communication module 32 can include a transceiver typically having a transmitter circuit and a receiver circuit, which respectively transmit outgoing radio frequency signals (e.g., to the network 5, a router or directly to another terminal) and receive incoming radio frequency signals (e.g., from the network 5, a router or directly to another terminal), such as voice and data signals, via an antenna. The communication module 32 may include a short range transmitter and receiver, such as a Bluetooth transmitter and receiver. The antenna may be an embedded antenna, a retractable antenna or any antenna known to those having skill in the art without departing from the scope of the present invention. The radio frequency signals transmitted between the mobile terminal 10A and the network 5, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The mobile terminal 10A may also be configured to electrically couple with another terminal via a wireline or cable for the transmission of digital communication signals therebetween. The mobile terminal 10A may include further components such as a camera device configured to generate a still image and/or video data stream based on incident light.

According to some embodiments, the mobile terminal 10A is a handheld mobile terminal. By "handheld mobile terminal," it is meant that the outer dimensions of the mobile terminal are adapted and suitable for use by a typical operator using one hand. According to some embodiments, the total volume of the handheld mobile terminal 10A is less than about 200 cc. According to some embodiments, the total volume of the handheld terminal 10A is less than about 100 cc. According to some embodiments, the total volume of the handheld mobile terminal 10A is between about 50 and 100 cc. According to some embodiments, no dimension of the handheld mobile terminal 10A exceeds about 200 mm.

Figure 2:
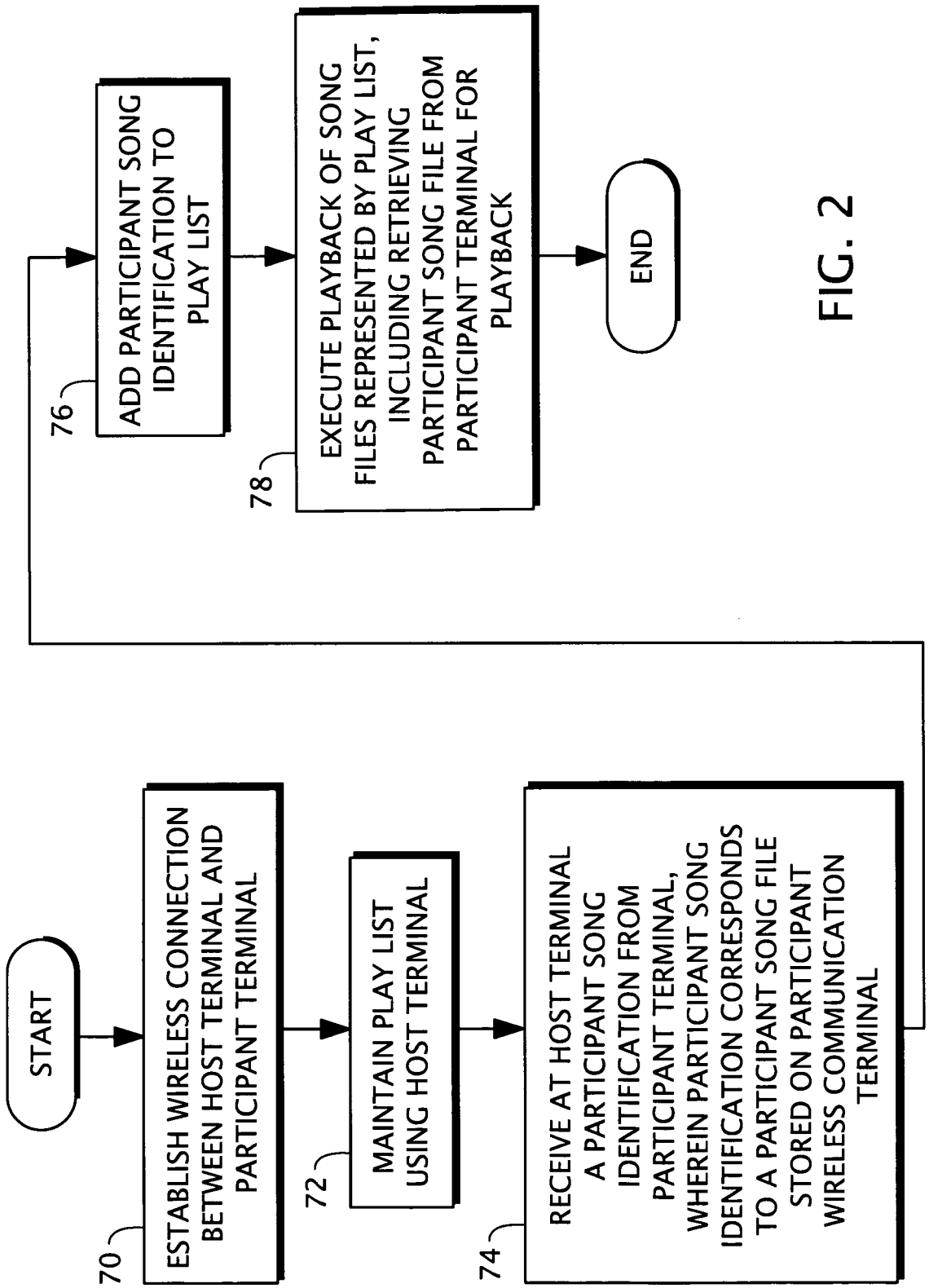
FIG. 2 is a flowchart illustrating methods in accordance with some embodiments of the present invention.

A method for providing a song play list using a wireless communication terminal (e.g., the mobile terminal 10A) according to some embodiments of the present invention will now be described with reference to the flowchart of FIG. 2. Referring to the embodiments of FIG. 2, the method includes establishing a wireless connection between the host wireless communication terminal and a participant wireless communication terminal (Block 70). A play list is maintained using the host wireless communication terminal (Block 72). The play list represents song files to be played. A participant song identification from the participant wireless communication terminal is received at the host wireless communication terminal (Block 74). The participant song identification corresponds to or designates a participant song file stored on the participant wireless communication terminal. The participant song identification is added to the play list (Block 76). Thereafter, playback of the song files represented by the play list is executed (Block 78). Execution of playback of the song file includes retrieving the participant song file from the participant wireless communication terminal for playback.

According to some embodiments, connections are established between the host wireless communication terminal and a plurality of participant wireless communication terminals, and the host wireless communication terminal receives a plurality of participant song identifications from the plurality of participant wireless communication terminals, adds each of the participant song identifications to the play list, and retrieves the participant song files from each of the respective participant wireless communication terminals for playback. According to some embodiments, communication between the host wireless communication terminal and the participant wireless communication terminal is accomplished via a direct point-to-point interface, such as a Bluetooth wireless RF connection. According to some embodiments, communication between the host wireless communication terminal and the participant wireless communication terminal is accomplished via an indirect interface, such as through a WLAN or cellular-based system. Further aspects and embodiments of the present invention will be apparent from the following descriptions of further embodiments.

Figure 3:
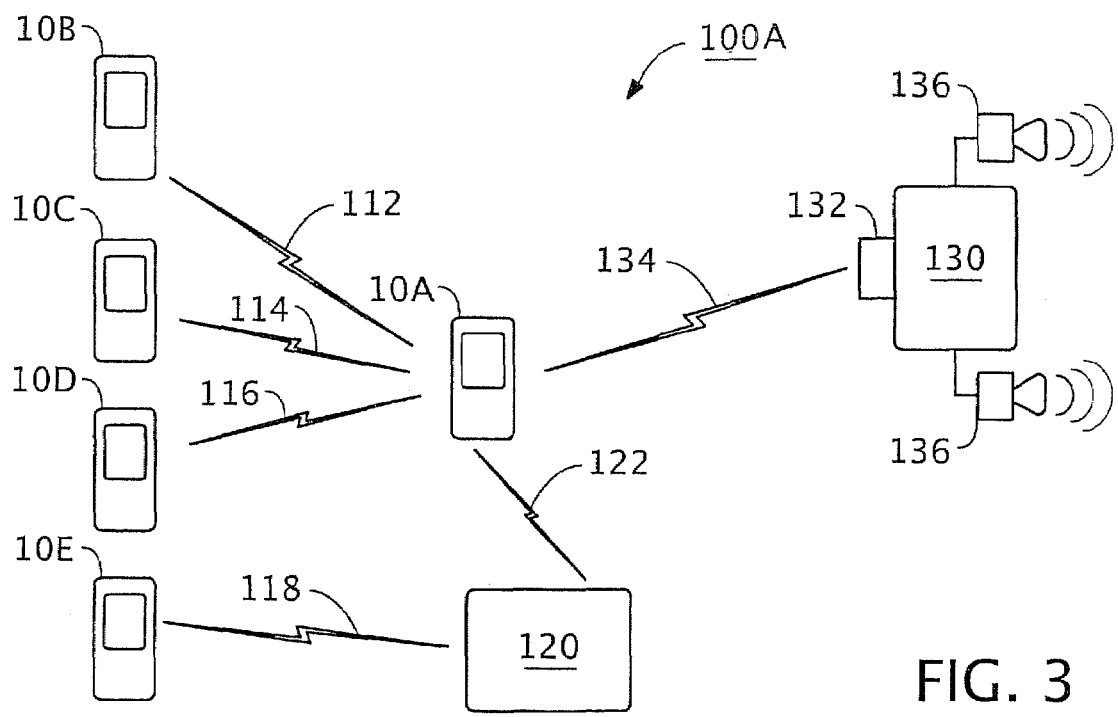
FIG. 3 is a schematic diagram of a song file playback system according to some embodiments of the present invention including the mobile wireless communication terminal of FIG. 1.

With reference to FIG. 3, a song file playback system 100A according to embodiments of the present invention is shown therein. The system 100A includes the mobile wireless communication terminal 10A (also referred to herein as the "host wireless communication terminal" or "host terminal"), a plurality of additional participant wireless communication terminals 10B, 10C, 10D, and 10E (also referred to herein as the "participant wireless communication terminals" or "participant terminals"), and a media center 130.

The terminals 10B-E may be configured as described above with regard to the terminal 10A. The terminals 10B-E each include a wireless communication module 32 and a song management module 40. However, the respective song management modules may be differently configured for each terminal 10A-E depending on the intended functionality of the device. According to some embodiments, all or some of the terminals 10B-E are mobile wireless communication terminals. According to some embodiments, all or some of the terminals 10A-E are handheld mobile wireless communication terminals.

The media center 130 includes apparatus adapted to convert an audio signal (e.g., a digital audio signal) to corresponding sound. The media center 130 may include, for example, a PC or laptop, a television, an audio receiver, stereo equipment, etc. The illustrated media center 130 includes a wireless communication module 132 and sound transducers (speakers) 136. The wireless communication module 132 may be integrated with the media center 130 or may be an auxiliary or plug-in wireless communication module such as the Bluetooth Media Viewer MMV-100 module or Bluetooth Media Viewer MMV-200 module, each available from Sony Ericsson of Sweden.

The system 100A will now be described using an illustrative example of use. A group of users at a gathering each have a respective one of the terminals 10A-E. Various songs are stored on one or more (typically two or more) of the terminals 10A-E. The users may wish to share the songs stored on their mobile terminals with the other users at the gathering by playing their songs on the media center 130. With known and available technology, this can be accomplished by having each user send (via Bluetooth, etc.) his or her songs (i.e., music audio files) to the media center 130 one at a time, song by song. However, this method requires substantial and active interaction from each contributing user. Such involvement may be inconvenient and/or not conducive to the setting (e.g., a party).

In accordance with embodiments of the present invention, the foregoing shortcomings can be overcome by creating and maintaining a play list of songs and executing playback of the songs (i.e., the music audio files) using the host terminal 10A. Typically, each terminal 10A-E will have the appropriate song management module 40 (e.g., software or firmware application) installed thereon.

The host terminal 10A is chosen to be the master or host terminal and the participant terminals 10B-E are each designated as slave or participant terminals. The controller 30 of the host terminal 10A establishes a wireless connection (i.e., communicatively couples) with each of the participant terminals 10B-E. According to some embodiments the wireless connection is a direct wireless communication interface connection, according to some embodiments, a direct RF connection and, according to some embodiments, a Bluetooth connection. The connections may be established in known manner. For example, in the case of Bluetooth connections, the participant (slave) terminals 10B-E may be set to a searchable/discoverable state and the host (master) terminal 10A emits an inquiry to identify the available participant (slave) terminals 10B-E to form a piconet or personal area network.

As illustrated, the host terminal 10A communicates with the participant terminals 10B, 10C and 10D via direct point-to-point wireless interfaces or links 112, 114 and 116, respectively, and with the participant terminal 10E via wireless interfaces or links 118, 122 through a WLAN router 120. It will be appreciated that, according to some embodiments, the interfaces may be various combinations of wireless interfaces that are direct (e.g., Bluetooth) or indirect (e.g., via a WLAN router or a cellular network 5). According to some contemplated embodiments, all of the signals provided between the host terminal 10A and the participant terminals 10B-E to execute the song sharing procedure are provided via direct point-to-point wireless interfaces. According to some contemplated embodiments, all of the signals provided between the host terminal 10A and the participant terminals to execute the song sharing procedure are provided via direct wireless radio frequency (RF) interfaces such as Bluetooth interfaces.

Before or after establishing the connections, the host terminal 10A may identify and designate valid participant terminals by any suitable method. According to some embodiments, the host terminal 10A will poll or send an invitation to all or a selected group of potential participant terminals (e.g., those within operational range of the host terminal's Bluetooth signal). The potential participant terminals may then opt in by replying with an acceptance of the invitation. Alternatively or additionally, the host terminal 10A may accept unsolicited requests from participant terminals to participate. The host terminal 10A may be used to define specific groups such as a listing of the potential participant terminals that will be permitted to participate (i.e., contribute songs to the play list).

The host terminal 10A is also communicatively coupled to the media center 130 to provide wireless song data signals via a wireless interface or link 134 to the communication module 132. Alternatively, the host terminal 10A can be connected to the media center 130 using a wireline or signal cable.

Once the connections are established between the host terminal 10A and the participant terminals 10B-E, each participant can send a participant song identification designating a song stored on the participant's terminal 10B-E. The song management module 40 of the sending participant terminal 10B-E may provide a user interface to facilitate the selection and sending of the song identification(s). For example, the module 40 may generate a list of the available stored songs and check boxes for selecting the song(s) to send to the host terminal 10A.

The host terminal 10A receives the participant song identifications from the participant terminals 10B-E. The song management module 40 of the host terminal 10A creates and maintains a host play list of these song identifications. The host play list represents song files to be played.

Figure 4:
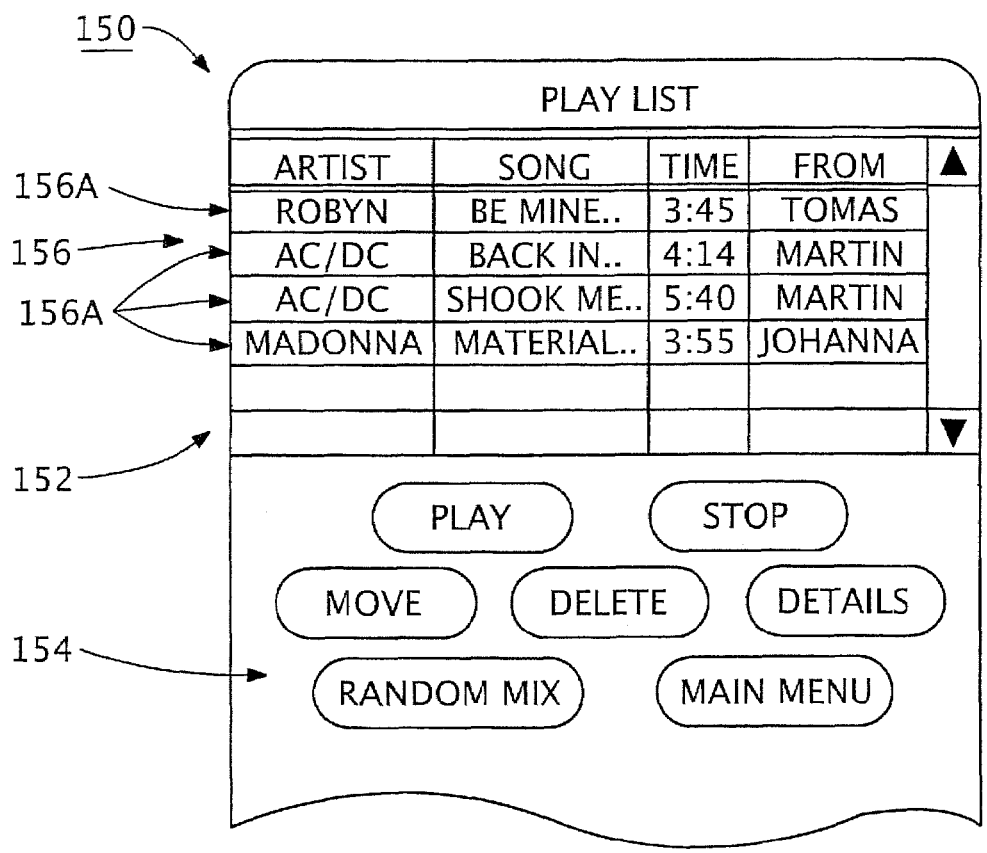
FIG. 4 is a schematic diagram illustrating a display of the mobile wireless communication terminal of FIG. 1 in accordance with some embodiments of the present invention.

Each song management module 40 provides a display 150 on the associated terminal 10A-E as shown in FIG. 4. The display provided on the host terminal 10A may differ from the display provided on the participant terminals 10B-E. For example, the portions of the display 150 related to management functionality may be omitted from the participant terminal displays. Alternatively, the song management module 40 may provide no display on the participant terminals 10B-E.

In the illustrated embodiment, the display 150 includes a play list field 152 and control buttons 154 (e.g., soft keys). The control buttons 154 will typically only be displayed on the host terminal display. A play list 156 is displayed in the play list field 152. The play list 156 includes a row-by-row series of song identifications 156A, each corresponding to a respective song file. As illustrated, each song identification includes a song artist, a song name, and a song play time corresponding to the associated song file, as well as an identification of the participant that has submitted the song identification. It will be appreciated that more, less and/or different information may be provided as well.

The host may selectively manage play of the songs represented by the song list 156 using the control buttons 154, for example. For example, the "PLAY" and "STOP" buttons may be used to start and stop transmission of the song files to the media center 130. The "MOVE" button may be used to prioritize or change the order of the song identifications 156A in the play list 156 (i.e., to change the order in which the associated song files will be played). The "DELETE" button may be used to delete a song identification 156A from the play list 156. The "DETAILS" button may be used to delete a song identification 156A from the play list 156 so that the associated song file will not be played. The "RANDOM MIX" button may be used to cause the host terminal 10A to execute playback of the song files (i.e., send the song files to the media center 130) in a random or other non-sequential order. Typically, the host terminal 10A will execute playback of the song files in the listed sequence unless the random or other non-sequential mode is in effect.

Other functionality could also be provided. For example, the host terminal 10A may allow the user to change the order of the song identifications 156A according to one or more selected attributes (e.g., contributing participant, song length, etc.). The host terminal 10A may be configured to designate which of the participant terminals 10B-E are permitted to add song identifications to the play list 156. The participant terminals 10B-E may be enabled to edit or modify the song list 156 in addition to adding song identifications. In this case, the host terminal 10A may be configured to allow the host to select which of the participant terminals 10B-E are and are not authorized to modify the song play list 156 (i.e., enable and disable the play list edit capability of the participant terminals).

When the host terminal 10A is in play mode, the controller 30 of the host terminal 10A will identify the song identification 156A that is to be played thereafter. The song identification identified may be the song identification that is to be played next. The host terminal 10A will then send a song file request to the corresponding one of the participant terminals 10B-E to retrieve the song file corresponding to the song identification.

The corresponding participant terminal will then send a copy of the identified song file (which is stored on the participant terminal) to the host terminal 10A. According to some embodiments, the participant terminal sends the song file to the host terminal 10A as a copy of the song file that is then temporarily stored on the host terminal 10A (e.g., in the memory 34). According to other embodiments, the participant terminal sends the song file to the host terminal 10A as a streaming song file. According to some embodiments, the request and song file signals between the host terminal and the participant terminal are sent wirelessly and, according to some embodiments, via a direct wireless RF connection such as Bluetooth.

The controller 30 of the host terminal 10A then executes playback of the retrieved song file by sending the song file to the media center 130. The song file may be stored on the media center 130 for playback. Alternatively, the song file may be streamed to the media center 130, for example, as the song file is streamed from the originating participant terminal to the host terminal 10A. It may be preferable or necessary to stream the song file from the participant terminal to the host terminal and/or from the host terminal to the media center 130 if the allocated memory space on the host terminal 10A is insufficient and/or storage of the song file on the host terminal 10A is prevented or illegal. According to some embodiments, the song file, whether streamed or stored in whole, will be automatically erased (i.e., without user intervention) from the host terminal 10A during or after playback.

The controller 30 of the host terminal 10A may execute the foregoing steps for each song identification 156A in turn and automatically (i.e., without user intervention). As the host terminal 10A runs through the song list 156 in this fashion, the host may modify the play list 156 as desired. Also, according to some embodiments, the participant terminals 10B-E can add new song identifications to the song list 156 as the controller 30 of the host terminal 10A runs through the play list 156. According to some embodiments, new participant terminals can join the group and submit song identifications as the host terminal 10A runs through the play list 156.

The system 100A can provide a convenient and enjoyable mechanism for playing songs selected by a group of people. The system 100A provides playback execution functionality and also allows the host terminal (and, in some cases, the participant terminals) to create, coordinate, control and/or manage the song play list. In practice, for example, partygoers can add songs from their own participant terminals to a song play list maintained on a host terminal (e.g., the party host's own mobile terminal). When their song's turn arrives in the playback sequence, a copy of the song file will automatically be sent to the host terminal and played. Thus, the partygoer need not take any further action. When, in accordance with some embodiments, the request and song transfer signals are communicated between the host terminal and the participant terminal via a direct wireless connection (e.g., an RF interface such as a Bluetooth connection), the partygoer may simply place his or her participant terminal in a pocket or handbag. Participants may be added and removed as the procedure is executed. For example, when a participant leaves the Bluetooth range, his or her songs may be deleted from or moved down the play list.

Figure 5:
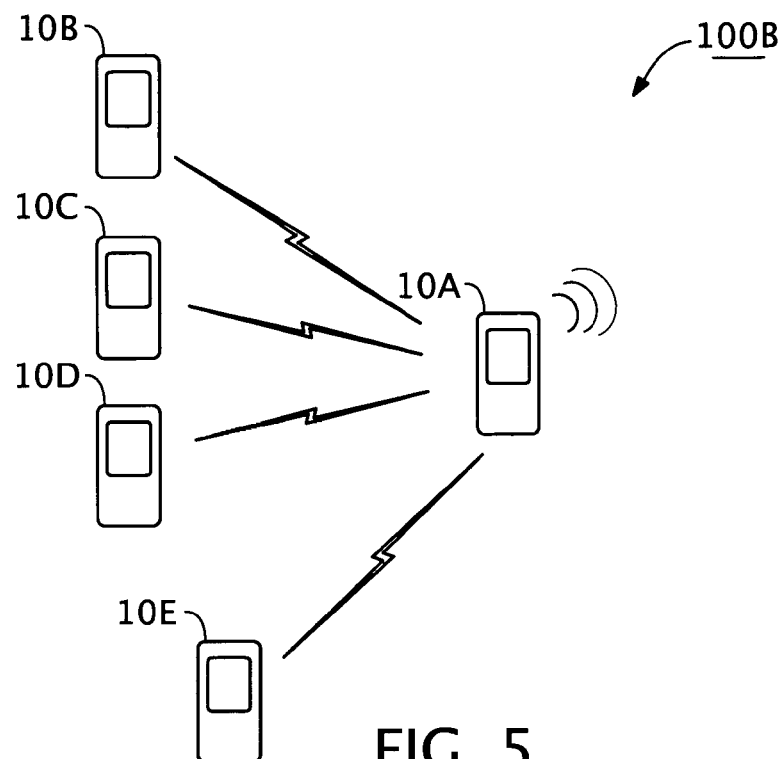
FIG. 5 is a schematic diagram of a song file playback system according to further embodiments of the present invention including the mobile wireless communication terminal of FIG. 1.

Referring now to FIG. 5, a system 100B according to further embodiments of the present invention is shown therein including the host terminal 10A and the participant terminals 10B-E. The system 100B differs from the system 100A (FIG. 2) in that the media center 130 is omitted and playback of the song files from the song play list 156 is conducted via the speaker 24 of the host terminal 10A.

Figure 6:
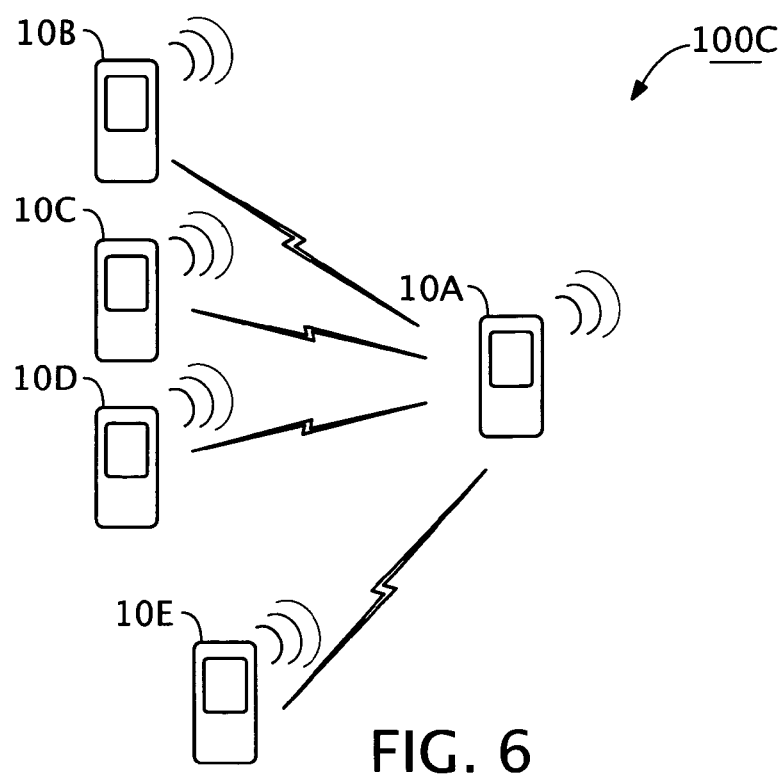
FIG. 6 is a schematic diagram of a song file playback system according to further embodiments of the present invention including the mobile wireless communication terminal of FIG. 1.

Referring now to FIG. 6, a system 100C according to further embodiments of the present invention is shown therein including the host terminal 10A and the participant terminals 10B-E. The system 100C differs from the system 100B (FIG. 5) in that playback of the song files from the song play list 156 is conducted via the speaker 24 of the host terminal 10A and, additionally, through the respective speakers of the participant terminals 10B-E and/or through one or more headsets (e.g., in-ear stereo headsets) operatively connected to the participant terminals 10B-E. More particularly, the controller 30 of the host terminal 10A plays each song file in the same manner as described above and also sends the song file to the participant terminals 10B-E for simultaneous playback. Thus, the host terminal 10A creates and manages a song play list that may include song identifications from the participant terminals 10B-E, retrieves copies of the song files from the appropriate participant terminals 10B-E as needed, and distributes the copies of the song files to the participant terminals 10B-E for playback. According to some embodiments, the song transfer signal is sent from the host terminal 10A to the participant terminals 10B-E wirelessly and, according to some embodiments via a direct wireless RF connection such as Bluetooth. According to some embodiments, the song files are streamed to the participant terminals 10B-E. The host terminal 10A may be configured to permit the host to designate which of the participant terminals 10B-E will receive playback signals and which of the participant terminals 10B-E are authorized to submit song identifications to the play list 156, and these two groups may differ.

The host terminal 10A may be configured to allow the user to selectively choose the device or combination of devices for playback from the various options discussed above. For example, the host terminal 10A may be configured to execute playback via only the speaker 24 of the host terminal 10A, via the speaker of the host terminal 10A and the speakers of the participant terminals 10B-E, via the speakers of the participant terminals 10B-E and the media center 130, etc. It will be appreciated that, when the song files are played back via the speakers of the participant terminals 10B-E, the user of a given one of the participant terminals may disable the speaker thereof and/or may relay the song file for playback on another device (e.g., an associated further media center or the like).

According to further embodiments, the controller 30 of the host terminal 10A may request and/or accept unsolicited a song catalog listing from a participant terminal. The song catalog listing includes song identifications representing each of the song files on the participant terminal or song identifications for all such song files the participant wishes to make available. The host terminal 10A may thereafter enable the host to select the song identifications of the song catalog listing the host wishes to add to the play list.

The application programs described herein, including the song management module 40, are illustrative of programs that implement various features according to embodiments of the present invention. It will be appreciated that other and/or additional application programs may be employed in accordance with embodiments of the present invention.

Although FIG. 1 illustrates an exemplary hardware/software architecture that may be used in mobile terminals and/or other electronic devices for management and playback of song files, it will be understood that the present invention is not limited to such a configuration but is intended to encompass any configuration capable of carrying out operations described herein. For example, although the memory 34 is illustrated as separate from the controller 30, the memory 34 or portions thereof may be considered as a part of the controller 30. More generally, while particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multi-processor system in accordance with various embodiments of the present invention.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A mobile wireless communication terminal comprising:
   a wireless communication module that is configured to communicate with other communication terminals over a wireless interface; and
   a controller that is configured to establish a connection with a participant wireless communication terminal via the wireless communication module, to maintain a play list representing song files to be played, to receive a participant song identification from the participant wireless communication terminal, wherein the participant song identification corresponds to a participant song file stored on the participant wireless communication terminal, to thereafter add the participant song identification to the play list, and to thereafter execute playback of the song files represented by the play list, including retrieving the participant song file from the participant wireless communication terminal for playback, including:
      automatically identifying a chosen song identification from the play list when the song identification arrives in a playback sequence of the play list; and
      when the participant song identification is the chosen song identification, automatically sending a song file request to the participant wireless communication terminal after receiving the participant song identification from the participant wireless communication terminal and after adding the participant song identification to the play list to retrieve the participant song file from the participant wireless communication terminal.

2. The wireless communication terminal of claim 1 wherein the controller is configured to establish a connection with a plurality of participant wireless communication terminals via the wireless communication module, to receive a plurality of participant song identifications from the plurality of participant wireless communication terminals, wherein each participant song identification corresponds to a respective participant song file stored on a respective one of the plurality of participant wireless communication terminals, to add each of the participant song identifications to the play list, and to retrieve the participant song files from each of the respective participant wireless communication terminals for playback.

3. The wireless communication terminal of claim 1 wherein the controller is configured to retrieve and execute the participant song file from the participant wireless communication terminal as a streaming music file.

4. The wireless communication terminal of claim 1 wherein the controller is configured to retrieve the participant song file from the participant wireless communication terminal, to store the participant song file on the wireless communication terminal, and to thereafter execute playback of the stored participant song file.

5. The wireless communication terminal of claim 1 wherein the controller is configured to send a playback signal to a media center for playback of the song files represented by the play list on the media center.

6. The wireless communication terminal of claim 1 including a sound transducer and wherein the controller is configured to play the song files represented by the play list using the sound transducer.

7. The wireless communication terminal of claim 1 wherein the controller is configured to send a playback signal to at least one participant wireless communication terminal for playback of the song files represented by the play list on the at least one participant wireless communication terminal.

8. The wireless communication terminal of claim 1 wherein the controller is configured to receive a song catalog listing from the participant wireless communication terminal representing available song files stored on the participant wireless communication terminal, to receive user input selecting from the available song files, and to add the selected available song files to the play list.

9. The wireless communication terminal of claim 1 wherein the controller is configured to send a listing signal to the participant wireless communication terminal representing the play list for display of the play list on the participant wireless communication terminal.

10. The wireless communication terminal of claim 1 wherein the controller is configured to modify the play list responsive to user input.

11. The wireless communication terminal of claim 1 wherein:
the wireless communication module is configured to communicate with other communication terminals over a direct point-to-point wireless interface; and
the controller is configured to establish the connection with the participant wireless communication terminal via the wireless communication module, receive the participant song identification from the participant wireless communication terminal, and retrieve the participant song file from the participant wireless communication terminal for playback all via the direct point-to-point wireless interface.

12. The wireless communication terminal of claim 1 wherein the wireless communication module comprises a short range transmitter, and the controller is configured to establish the connection with the participant wireless communication terminal, receive the participant song identification from the participant wireless communication terminal, and retrieve the participant song file from the participant wireless communication terminal for playback all via the short range transmitter.

13. The wireless communication terminal of claim 12 wherein the short range transmitter is a Bluetooth transmitter.

14. The wireless communication terminal of claim 1 wherein the wireless communication terminal includes a cellular telephone.

15. A system for providing a song play list, the system comprising:
a host mobile wireless communication terminal;
a participant wireless communication terminal;
wherein the host wireless communication terminal includes:
a wireless communication module that is configured to communicate with other communication terminals over a wireless interface; and
a controller that is configured to establish a connection with a participant wireless communication terminal via the wireless communication module, to maintain a play list representing song files to be played, to receive a participant song identification from the participant wireless communication terminal, wherein the participant song identification corresponds to a participant song file stored on the participant wireless communication terminal, to thereafter add the participant song identification to the play list, and to thereafter execute playback of the song files represented by the play list, including retrieving the participant song file from the participant wireless communication terminal for playback, including:
automatically identifying a chosen song identification from the play list when the song identification arrives in a playback sequence of the play list; and
when the participant song identification is the chosen song identification, automatically sending a song file request to the participant wireless communication terminal after receiving the participant song identification from the participant wireless communication terminal and after adding the participant song identification to the play list to retrieve the participant song file from the participant wireless communication terminal.

16. The system of claim 15 including a plurality of participant wireless communication terminals, and wherein the controller is configured to establish a connection with each of the plurality of participant wireless communication terminals, to receive a plurality of participant song identifications from the plurality of participant wireless communication terminals, wherein each participant song identification corresponds to a respective participant song file stored on a respective one of the plurality of participant wireless communication terminals, to add each of the participant song identifications to the play list, and to retrieve the participant song files from each of the respective participant wireless communication terminals for playback.

17. A method for providing a song play list using a host wireless communication terminal, the method comprising:
establishing a wireless connection between the host wireless communication terminal and a participant wireless communication terminal;
maintaining a play list using the host wireless communication terminal, the play list representing song files to be played;
receiving at the host wireless communication terminal a participant song identification from the participant wireless communication terminal, wherein the participant song identification corresponds to a participant song file stored on the participant wireless communication terminal;
thereafter adding the participant song identification to the play list; thereafter
executing playback of the song files represented by the play list, including retrieving the participant song file from the participant wireless communication terminal for playback, including, using the host wireless communication terminal:
automatically identifying a chosen song identification from the play list when the song identification arrives in a playback sequence of the play list; and
when the participant song identification is the chosen song identification, after receiving the participant song identification from the participant wireless communication terminal and adding the participant song identification to the play list, automatically sending a song file request from the host wireless communications terminal to the participant wireless communications terminal to retrieve the participant song file from the participant wireless communication terminal.

18. A computer program product for providing a song play list using a host wireless communication terminal, the computer program product comprising:
a computer usable medium having computer usable program code embodied therein, the computer usable program code comprising:

computer usable program code configured to establish a wireless connection between the host wireless communication terminal and a participant wireless communication terminal;

computer usable program code configured to maintain a play list using the host wireless communication terminal, the play list representing song files to be played;

computer usable program code configured to receive at the host wireless communication terminal a participant song identification from the participant wireless communication terminal, wherein the participant song identification corresponds to a participant song file stored on the participant wireless communication terminal;

computer usable program code configured to thereafter add the participant song identification to the play list;

computer usable program code configured to thereafter execute playback of the song files represented by the play list, including retrieving the participant song file from the participant wireless communication terminal for playback, including:

automatically identifying a chosen song identification from the play list to be played back when the song identification arrives in a playback sequence of the play list; and when the participant song identification is the chosen song identification, after receiving the participant song identification from the participant wireless communication terminal and after adding the participant song identification to the play list, automatically sending the song file request to the participant wireless communication terminal to retrieve the participant song file from the participant wireless communication terminal.

19. The wireless communication terminal of claim 8 including a user interface and wherein the controller is configured to receive the user input selecting from the available song files via the user interface.

20. The method of claim 17 including receiving the song file request at the participant wireless communication terminal and, in response thereto, automatically sending the participant song file from the participant wireless communication terminal to the host wireless communication terminal for playback.

21. The system of claim 15 wherein the participant wireless communication terminal is configured to receive the song file request at the participant wireless communication terminal and, in response thereto, automatically send the participant song file from the participant wireless communication terminal to the host wireless communication terminal for playback.

* * * * *